July 15, 1952
W. G. BROWN ET AL
2,603,462
APPARATUS FOR PREPARING AND SPRAYING
CEMENTITIOUS MATERIALS
Filed March 19, 1949
4 Sheets-Sheet 3
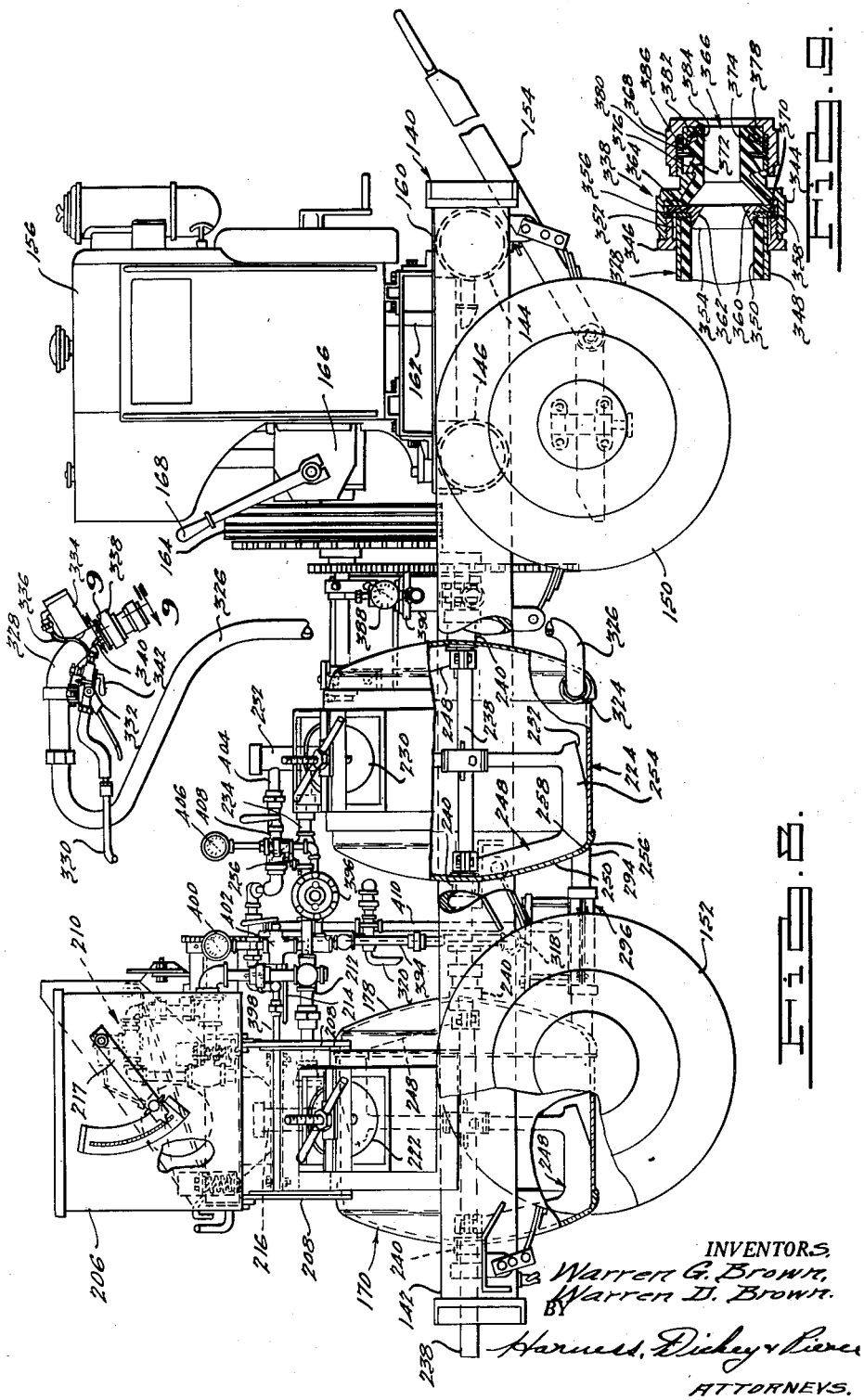
INVENTORS,
Warren G. Brown,
Warren D. Brown.
BY
Harness, Dickey & Pierce
ATTORNEYS.

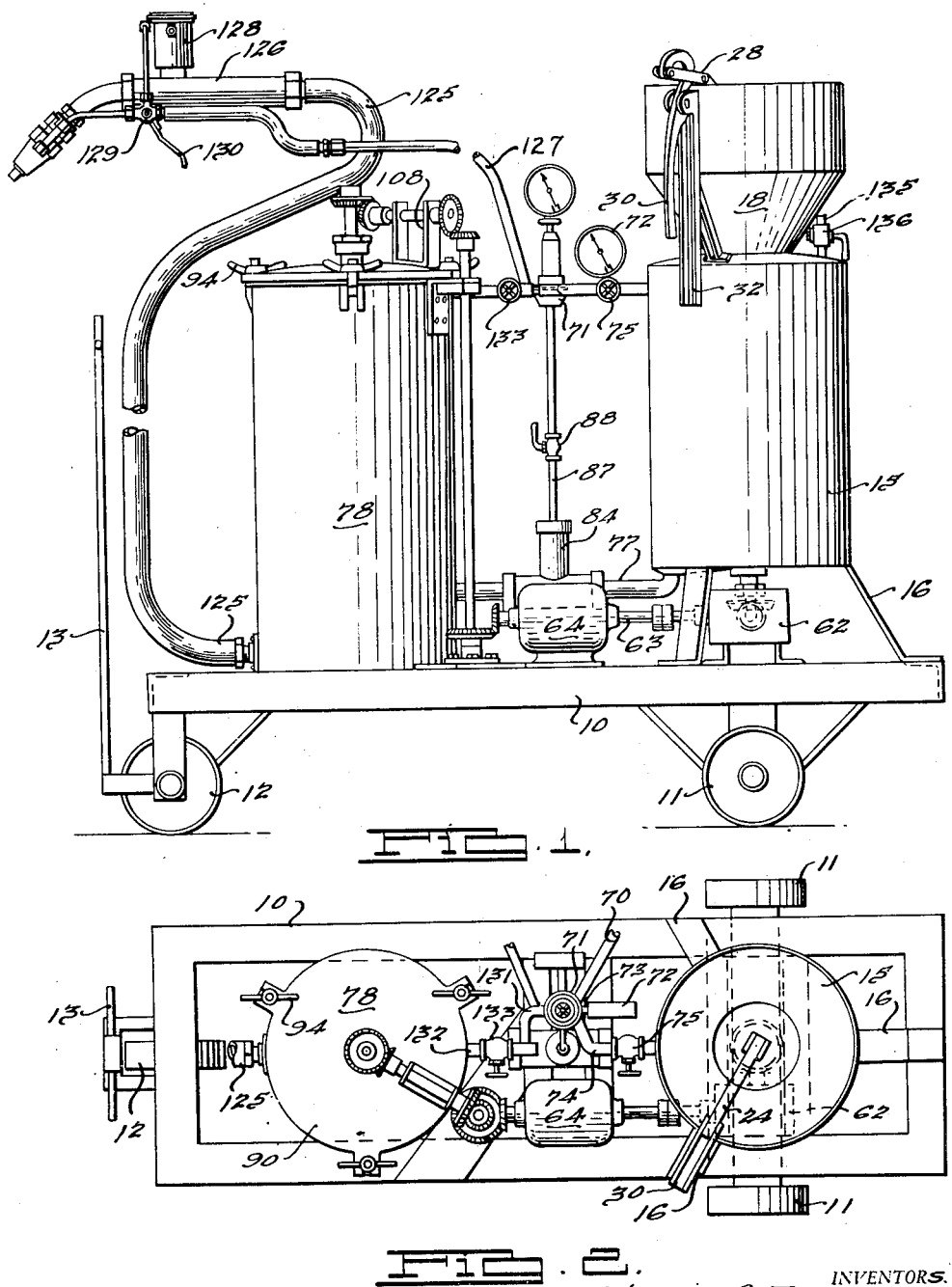

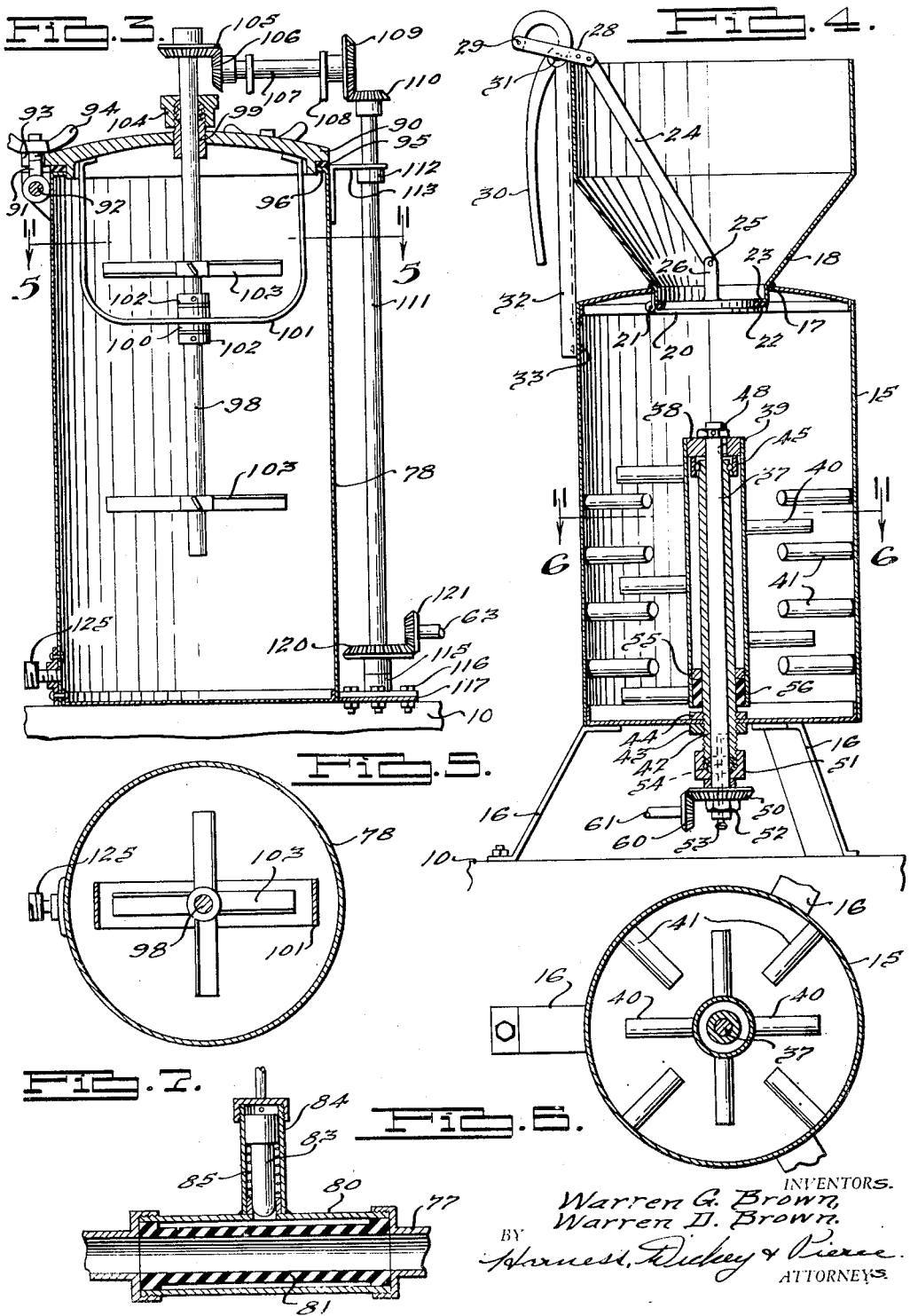

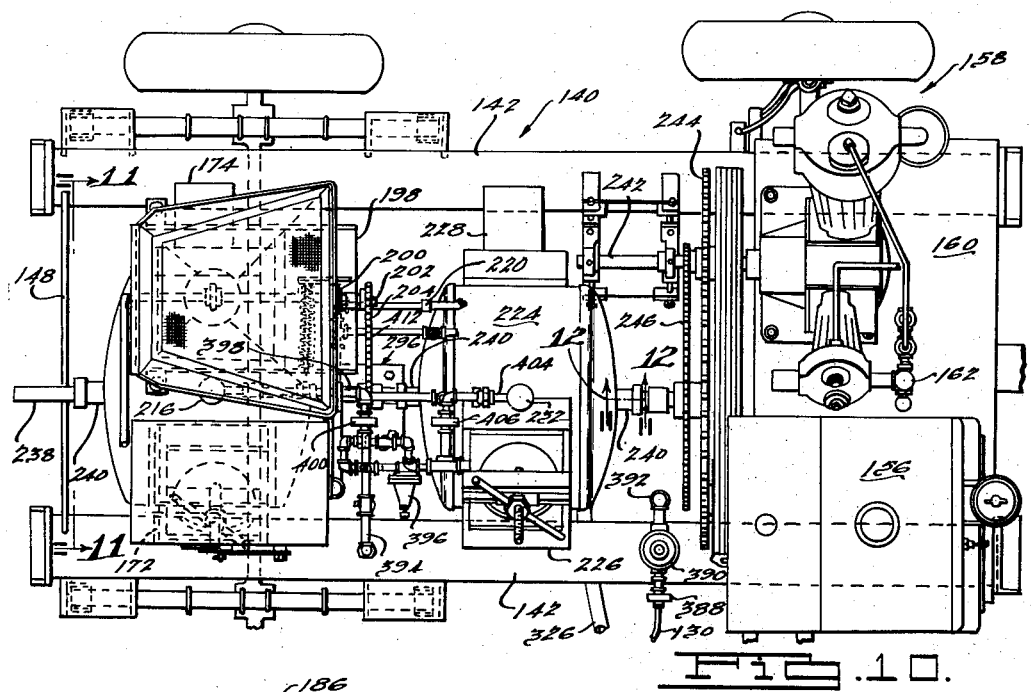

UNITED STATES PATENT OFFICE 2,603,462

APPARATUS FOR PREPARING AND SPRAYING CEMENTITIOUS MATERIALS

Warren G. Brown and Warren Durand Brown, Detroit, Mich.

Application March 19, 1949, Serial No. 82,404

5 Claims. (Cl. 259—169)

The present invention relates to an improved apparatus for preparing and spraying cementitious materials suitable both for the weatherproofing, waterproofing and restoration of existing masonry and for the construction of new concrete structures. More particularly it relates to such an apparatus capable of preparing and applying cementitious materials which upon setting will be substantially free of shrinkage cracks and have greatly improved strength over that of similar materials prepared and applied by previously known apparatus. The present application is a continuation-in-part of our copending application for patent, Serial No. 514,042, filed December 13, 1943, which was a division of our application for patent, Serial No. 467,680, filed December 3, 1942, copending therewith, which applications are now abandoned.

Prior to the present invention cementitious materials have been prepared and applied in a large variety of ways, each of which has been attended with greater or less difficulties and none of which have produced a satisfactory product substantially free of shrinkage cracks. In some instances it was attempted to apply the material as a coating by brushing it on. This required tedious manual effort and the material would not stay uniformly mixed. Also, it was difficult to obtain a smoothly distributed coating. In all cementitious materials prepared and put in place by previously known apparatus, the material had a shrinkage factor of five per cent and a relatively low crushing strength compared to that of material prepared and applied by the present apparatus.

One of the very serious weaknesses of all such previously known apparatus, including that in which the material was applied in the form of a spray, is that after setting and hardening, the materials, especially when used in the form of coatings, have a large number of minute shrinkage cracks. This not only prevented that solid unitary appearance which is desirable in a surface coating, but also, and what is much more important, constituted a very serious structural defect in that these cracks permit a weathering of the coating, causing these cracks to gradually widen and eventually work entirely through the coating and expose the coated structure.

Accordingly, it is an object of the present invention to provide an improved apparatus for preparing and applying cementitious coatings for the weatherproofing, waterproofing, and restoration of masonry, which, upon setting, will be substantially free of shrinkage cracks.

These shrinkage cracks, common to cementitious materials prepared in previously known equipment, result, at least in part, from the fact that when cement grouts are mixed in such equipment, a relatively low hydration of the cement particles is obtained and much of the water in the material at the time that it is put in place is in the form of free water mechanically held. The rate of evaporation of such water is much greater than the rate at which such water will be taken up as water of hydration, under the atmospheric conditions to which the material is subject when in position. For this reason much of the water present in the grout as free water at the time of application will evaporate and not be taken up as water of hydration. This evaporation leaves voids which result in the above-mentioned shrinkage cracks. An examination of cementitious materials prepared by such previously known apparatus indicates that only the outer portion of the cement particles are hydrated.

Accordingly, another object of the invention is to provide an improved apparatus for mixing and applying cementitious materials in which the hydration of the cement particles thereof, at the time of putting the material in place, is greatly improved.

It is also an object of the invention to provide an apparatus for preparing and putting in place cementitious materials having a much greater crushing strength than that of such materials prepared by any previously known equipment.

A further object of the invention is to provide an apparatus for mixing and applying cementitious materials, which, when put in place, are more uniformly mixed than is possible with materials mixed and applied by previously known equipment.

Another object of the invention is to provide an apparatus of the type above-indicated which is capable of continuous operation to provide a continuous supply of cement grout, the cement particles of which are much more uniformly and highly hydrated than the cement particles of material prepared by previously known equipment so that an operator may continuously put in place, without interruption, a cementitious material which after setting and hardening will be substantially free of shrinkage cracks.

A further object of the invention is to provide an apparatus of the type indicated above, including improved self-cleaning tanks adapted to prevent materials from collecting on the inner surfaces of the tanks to form partially-set or hardened projections built up of the cementitious materials.

It is also an object of the invention to provide an apparatus of the type indicated above, including an improved stuffing box adapted to provide a bearing for rotatably supporting a shaft passing through the wall of a tank containing cementitious materials under pressure, and prevent entrance of the grout into the bearing.

Another object of the invention is to provide an apparatus of the type indicated above, including a spray gun having an improved adjustable nozzle which is simple in design, economical of construction and reliable and efficient in operation.

A further object of the invention is to provide an apparatus of the type indicated above, including an improved nozzle adapted to receive and spray a thick mixture of liquid and solid materials.

Other objects of the invention will become apparent from the following specification, from the drawings relating thereto, and from the claims hereinafter set forth.

For a better understanding of the invention, reference may be had to the drawings wherein:

Figure 1 is a side elevational view of apparatus constructed according to one form of the invention;

Fig. 2 is a plan view of the apparatus shown by Figure 1;

Fig. 3 is a view showing a vertical section of the tank seen at the left in Figs. 1 and 2;

Fig. 4 is a similar vertical section of the tank seen at the right in Figs. 1 and 2;

Fig. 5 is a cross-sectional view, taken substantially along the line 5—5 of Fig. 3;

Fig. 6 is a cross-sectional view, taken substantially along the line 6—6 of Fig. 4;

Fig. 7 is a cross-sectional view of a valve employed in the conduit conecting the tanks;

Fig. 8 is a side elevational view of apparatus constructed according to another form of the invention, and showing parts broken away;

Fig. 9 is a broken and enlarged sectional view of the apparatus illustrated in Fig. 8, taken substantially along the line 9—9 thereof;

Fig. 10 is a plan view of the apparatus illustrated in Fig. 8;

Fig. 11 is a broken and enlarged end elevational view of the apparatus illustrated in Fig. 10, taken substantially from the line 11—11 thereof;

Fig. 12 is a broken and enlarged sectional view of the apparatus illustrated in Fig. 10, taken substantially along the line 12—12 thereof; and Fig. 13 is a broken and enlarged sectional view of the valve in the conduit connecting the tanks of the apparatus illustrated in Figs. 8 and 10.

Referring to Figs. 1, 2 and 4, the apparatus includes a bed frame 10, supported on a pair of rear wheels 11, and a front steerable wheel 12 having a handle 13 for moving the apparatus from one place to another. A mixing tank 15 is supported on the bed 10 by legs 16, and, as best shown in Fig. 4, the upper end wall of the tank has an opening 17 through which the lower end of a hopper 18 projects. The hopper and upper end wall of the tank may be welded together around the edge of the opening so as to obtain a rigid as well as sealed joint.

A cover 20 is provided at the lower end of the hopper and is pivotally conected thereto at one side, as indicated at 21. This cover is adapted to be moved upwardly and it carries a sealing ring 22, which in turn is adapted to abut an inwardly-turned flange 23 on the lower edge of the hopper. For moving the cover 20 upwardly, a link 24 is pivotally connected, as indicated at 25, to a projection 26 on the cover and this link in turn at its upper end is rigidly fastened to a pair of toggle straps 28. The straps in turn are pivotally connected, as indicated at 29, to a gooseneck lever 30, which is in turn pivotally connected at an intermediate point 31 to a bar 32. This bar is rigidly fastened, as indicated at 33, to the tank, and may be similarly fastened or welded to the side of the hopper. When the lever 30 is swung clockwise, as seen in Fig. 4, the straps 28 and link 24 will be so moved as to open the cover 20 and it should be noted that when the parts are in the closed position, it is necessary first to break the toggle through movement of the lever before the cover 20 can open.

The mixture to be used may comprise an argillo-calcareous substance such as Portland cement, a suitable aggregate such as finely-divided sand, and water, although it should be understood that other ingredients such as water-proofing agents may be added, or that the mixture may comprise various other combinations, including Portland, or similar, cement. One part cement, three parts sand, and enough water to provide the required liquid condition may be used for instance, and these ingredients are placed in the tank 15 in proper proportions, and then the cover 20 is closed.

For agitating and mixing the materials in the tank 15, a rotary shaft 37 extends upwardly through the bottom wall of the tank, and this shaft is keyed to the upper end wall 38 of a sleeve 39 having radially projecting elements 40 at spaced points thereon for stirring the materials in the tank. These elements move in-between other and stationary elements 41 fastened to the inner side of the tank, and from this it will be appreciated that thorough stirring and mixing of the material may be obtained. The shaft 37 is rotatable in a stationary tube 42 fastened tightly in the bottom wall of the tank by threaded nuts 43 and 44 disposed respectively at the lower and upper sides of the wall. At its upper end the tube 42 has a thrust bearing 45 which engages the end wall 38 in the sleeve, and a nut 48 on the upper end of the shaft 37 retains the sleeve 39, tube 42, and shaft assembled.

Below the bottom wall, a bevel gear 50 is keyed to the lower end of the shaft, and this gear substantially abuts a packing gland 51 threaded on the lower end of the tube 42. A nut 52 is provided on the lower end of the shaft for holding the gear in place, and it will be noted that a grease fitting 53 is provided which communicates with a central passage 54 in the shaft leading to the external surface of the latter, from which it follows that the outer surface of the pin may be lubricated.

For sealing the sleeve 39 relative to the tube 42, a collar 55 is fastened to the interior of the sleeve adjacent its lower end, and while this collar does not have sealing engagement with the tube, it acts as a shoulder against which a rubber sealing sleeve 56 may press. Pressure within the tank tending to force the rubber sleeve 56 upwardly in the sleeve 39, acts to force the rubber against the collar 55 and expand the rubber into sealing engagement with the tube 42, from which it will be seen that leakage of material in the tank upwardly along the tube 42 will be prevented.

For rotating the shaft 37, a second bevel gear 60 meshes with the gear 50, and this second bevel gear is fastened to a shaft 61 which, as best shown by Figure 1, is connected to a reduction gearing box 62. The reduction gearing is connected to a shaft 63 of a motor 64, and from this it follows that the agitator and mixer within the tank 15 may be rotated at a desired speed.

With respect to mixing of the materials in the tank 15, it has been found that faster and much greater hydration of the cement particles occurs if the mixture is maintained under substantial pressure. Where no pressure on the materials is provided, considerable time is required for the cement particles to take up water in hydrating and furthermore only a relatively low hydration is obtained. During hydration, or taking up of water, the cement particles increase in volume, and where insufficient hydration has occurred, it has been found that during setting of the material after it is put in place, the material shrinks and leaves fine, hairline cracks. Where the materials are maintained under substantial pressure during mixing and agitation, the air appears to be forced out of the cement particles and a substantially higher and more uniform hydration of the cement particles is effected than may be obtained in materials prepared by previously known equipment, and that hydration is effected very rapidly. When the cement particles of the mix are hydrated in this manner, relatively little excess or free water is required in the mix to give it the desired fluidity. It is only this free or excess water which may evaporate since the release of water taken up as water of hydration requires a substantial amount of energy not supplied by normal atmospheric conditions during setting and hardening nor is it supplied during weathering of the material. For these reasons, materials prepared and applied with the present apparatus, undergo materially less shrinkage in setting and hardening and the fine, hairline shrinkage cracks obtained in material prepared and applied by previously known apparatus, in which a relatively low hydration of the cement particles is obtained, are practically eliminated. As an instance of pressure which has been found desirable for obtaining these results, an air line pressure of approximately 100 pounds per square inch may be used.

The extent to which the present apparatus eliminates shrinkage cracks is indicated by the fact that a recent visual inspection of 4800 lineal feet of a wall eleven feet high, which was coated with apparatus constructed according to the present invention, did not reveal a single shrinkage crack.

Another advantage of the present invention is that cementitious materials prepared by the present apparatus have been found to have much higher compressive strength characteristics than similar material prepared by previously known equipment. Standard 28 day compressive strength tests by a commercial testing laboratory have indicated strengths of as high as 10,000 pounds per square inch. Also it has been found that a substantially smaller quantity of water is required to give the desired degree of fluidity to the grout than is required when the materials are mixed by previously known equipment. By way of illustration, in a one-to-two mix, including one part cement to two parts of aggregate, it is only necessary to use 4¼ gallons of water per bag of cement, whereas in a similar one-to-two mix prepared in previously known equipment, it is necessary to use about 6½ gallons of water per bag of cement to get approximately the same degree of fluidity and the resulting material has an average strength of about 3,600 pounds per square inch in a standard 28 day compressive strength test. These very important advantages made possible by the apparatus of the present invention are believed to result from more uniform and much higher hydration of the cement particles, than is achieved in previously known equipment for the preparation of cementitious materials.

Now referring to Figs. 1 and 2 again, an air pressure line 70 is provided which leads to a pressure reducing valve 71. A gauge 72 connected to the high pressure side of the valve 71 by a conduit 73 indicates the line pressure supplied to the valve. A conduit 74 also connected to the high pressure side of the valve has a manually operable valve 75 therein and this conduit leads to the tank 15. With a line pressure in the line 70 of approximately 100 pounds per square inch, it is apparent that this pressure may be applied to the materials in the tank 15 and that the line may be cut off at any time by means of the valve 75.

After the material is mixed under pressure in the tank 15, it may be conducted through a conduit 77 to a second tank 78 also mounted on the bed 10. As best shown by Fig. 7, the conduit 77 includes a sleeve 80 containing a rubber tube 81 which is adapted to close the conduit to passage of fluid therethrough when the tube is collapsed at its center. For collapsing the tube, a plunger 83 is mounted in a small cylinder 84 welded to the side of the sleeve 80 and this plunger is adapted to be moved downwardly against the wall of the tube 81 by air pressure at the upper end of the plunger. A spring 85 is adapted to return the plunger to its inoperative position upon release of the pressure.

Referring again to Figures 1 and 2, the small cylinder 84 containing the plunger 83 is connected to an air pressure line 87 which in turn is connected to the low pressure side of the reducing valve 71. A manually operated valve 88 is provided in the line 87 so that the pressure may be cut off from the cylinder 84 and it might be mentioned in this connection that a suitable exhaust vent may be provided in the valve 88 so that when the valve is closed, air in the lower part of the conduit 87 and in the cylinder 84 may escape so as thereby to allow the spring to return the plunger to its inoperative position.

Referring now to Figures 3 and 7, the tank 78 has a cover 90 at its upper end which is adapted to be firmly held in closed position by a series of circumferentially spaced fastening means which may be readily released. Each of these fastening means includes a threaded shank 91 pivotally connected as indicated at 92 to the side wall of the tank and which may be moved into a slot 93 in the edge of the cover. A wing nut 94 on the end of the shank is adapted to be drawn tightly against the cover so as to hold it in closed position. A sealing element 95 between the edge of the cover and a flange 96 on the tank serves to seal the tank against leakage.

In order to continually agitate the liquid coating material in the tank 78, an agitator is provided which includes a shaft 98 journaled in a bearing element 99 fastened in the cover 90 and in a lower bearing element 100 fastened to a strap 101 having its ends welded to the underside of the cover. Collars 102 above and below the strap 101 and fastened to the shaft, serve to support and locate the latter vertically. Blade elements 103 fastened to the shaft 98 serve to agitate the material when the shaft is rotated.

Above the cover, a packing gland 104 is threaded onto the bearing element 99 so as to prevent leakage along the shaft and the upper end of the shaft has a bevel gear 105 which meshes with a second gear 106. The latter gear is mounted on a shaft 107 which, as best shown by Figure 1, is rotatably mounted in a U-shaped bracket 108 welded to the cover 90. The opposite end of the shaft 107 has a bevel gear 109 which meshes with a bevel gear 110 mounted on the upper end of a shaft 111. At its upper end, this shaft is turnably supported in a bearing 112 fastened to a bracket 113 in turn fastened to the side of the tank while the lower end of the shaft is journaled in a bearing 115 fastened by bolts 116 to a plate 117 in turn fastened to the side members of the bed 10. A bevel gear 120 on the lower end of the shaft 111 meshes with a bevel gear 121 mounted directly on the opposite end of the motor shaft 63. The agitator in tank 78 therefore may be driven at a faster rate of speed than the agitator in the tank 15.

In order to spray the liquid mixture in tank 78 onto a surface to be coated, a conduit 125 is connected to the bottom portion of the tank and this conduit leads to a spray gun 126. This spray gun may be of the type shown in our copending application Serial No. 355,450, filed September 5, 1940, now Patent No. 2,305,940, and briefly includes a rubber type valve on the order shown by Figure 7 which is normally held in a collapsed or closed position by air pressure delivered by a conduit 127 connected to the cylinder 128 of the valve and to the low pressure side of the reducing valve 71. A valve 129 having a trigger 130 may be used to open and close the conduit 127 and thus close and open the gun. It will be appreciated, however, that the plunger for closing the rubber valve might be held in a closed position by spring pressure and that a similar trigger might be used for moving the plunger and opening the valve.

For supplying a pressure to the grout in tank 78, a conduit 131 is connected to the low pressure side of the reducing valve 71 and this conduit in turn is connected to a conduit 132 connected to the upper part of the tank 78. A manually controlled valve 133 in the conduit 132 enables cutting off the air pressure from the tank.

In using the apparatus described, the proper ingredients are placed in the tank 15, it being understood that the valve 75 is first closed and that the valve 88 is open so that the rubber valve in conduit 77 is closed. Then the cover 20 is closed, air line valve 75 is opened, and the motor 64 is started so as to mix the material under pressure. After mixing the grout for a sufficient time, the valve 88 may be closed so as to open the conduit 77 and then the mixture is forced by the air pressure above it in tank 15 into the tank 78. After the liquid material has been transferred to tank 78, the valve 88 is again opened so as to close the conduit 77 and the valve 132 then may be opened if not opened previously, to place the liquid mix in tank 78 under the reduced air pressure. Following this the spray gun may be used for applying the liquid to the surface to be coated. It might be mentioned at this time that normally a pressure in tank 78 of about sixty pounds is found desirable and hence a differential of approximately forty pounds exists between the two tanks. This differential permits the relatively quick transfer of the mixed material from the mixing tank 15 to the spraying tank 78 in the manner above described. It will be appreciated that the amount of differential required, between the pressures in the tanks 15 and 78, will vary depending upon the consistency of the mix and the size of the conduit 77. It has been found desirable to have this pressure differential be at least twenty-five pounds per square inch.

The above mentioned sixty pounds pressure in the spraying tank 78 may also vary considerably depending upon numerous factors such as the size and length of the conduit 125 and the elevation of the spray gun 126 above the level of the material in the tank 78. By way of example, it has been found that with a three-quarter inch hose one hundred feet long, a pressure of at least thirty pounds per square inch plus three-quarters of a pound per square inch for each foot of elevation of the spray gun above the level of the material in the tank 78, is required to insure proper delivery of the mixed material from the tank 78 to the spray gun 126.

It will be appreciated of course that in spraying surfaces at great elevations above the tank 78 it may be necessary to employ a pressure within the tank 78 considerable greater than the above mentioned pressure in the mixing tank 15. In such cases it will be understood that the pressure within the tank 15 may be considerably more than one hundred pounds per square inch in order to provide the desired differential between the pressures in the tanks 15 and 78.

While the operator is using the spray gun and applying the liquid now in tank 78, a second operator may close the air valve 75 and exhaust air in the tank by means of a pipe 135 and valve 136. Then, while the first operator is spraying with liquid in tank 78, a new mix may be placed in the tank 15 and prepared. This new mix may be transferred to tank 78 at any time and even during operation of the spray gun, since it is only necessary to close valve 88 to open conduit 77 and then the differential in pressure will force the mix from tank 15 into tank 78. This manner of operating the equipment may be continued indefinitely and continuous spraying may thus be effected.

When it is desired to clean the equipment, the covers may be removed and the tanks filled with water and then the covers replaced. Following this, the water in both tanks may be agitated and the solution then evacuated completely through the spray gun by air pressure. Incidentally, this cleaning of the tanks also cleans the spray gun and the conduit leading to the latter. It might be stated too that if desired, water pipes having valves therein may be connected to both tanks so as to supply water thereto when desired and particularly to fill the tanks for cleaning. In this event opening of the covers would not be necessary to place water in the tanks. It may be added that an air escape valve might be provided too on tank 78 so that when desired this tank could be opened to the atmosphere so as to allow air under pressure therein to exhaust.

An apparatus constructed according to a modified form of the present invention, is illustrated in Figures 8 to 13, inclusive. The apparatus there illustrated includes a supporting frame generally designated 140 and comprising a pair of spaced parallel, longitudinally extending and relative large tubular members 142 closed at their opposite ends and interconnected adjacent their forward ends by a pair of parallel, longitudinally spaced, transversely extending tubular members 144 and 146. The interior of these transversely extending tubular members 144 and 146 communicates with the interior of the longitudinally extending members 142 to afford a compressed air reservoir. Adjacent their rear ends the longitudinally extending members 142 are securely held in spaced relation by a transversely extending brace 148. The frame 140 is suitably supported on front and rear wheels 150 and 152 respectively, and is provided with a suitable draw bar 154 at its front end.

A motor generally indicated at 156 and a compressor generally indicated at 158 are mounted on a platform 160 which is supported adjacent the front end of the frame 140 on the transversely extending members 144 and 146. The compressor 158 is connected to the reservoir defined by the tubular members 142, 144 and 146 by a line 162 connected to the member 144. A multiple pulley belt drive 164 is provided for operatively connecting the compressor 158 to the motor 156 and a suitable clutch 166, controlled by a clutch lever 168, is provided between the motor 156 and the drive 164.

A cylindrical mixing tank 170, the opposite ends of which are spherically curved outwardly, is disposed with its axis extending parallel to the frame members 142 and is mounted on the frame 140 in spaced relation to the rear end thereof, by means of brackets 172 and 174. The tank 170, as best illustrated in Fig. 11, has a generally tangentially upwardly extending filler neck 176 disposed midway between its ends. Secured to the upper end of the neck 176 is a hopper mechanism generally indicated at 178 and comprising a lower hopper portion 180 fixed to the upper end of the neck 176 and provided with a pivotally mounted cover 182 closing the opening at its lower end and adapted to be operated by an external handle 184. The hopper mechanism 178 also includes a larger and upper hopper 186 movably mounted on the fixed hopper portion 180 by means of cooperating brackets 188 and 190 mounted on the two hopper portions 186 and 180, respectively, and receiving through bolts 192. The upper movable hopper portion 186 is resiliently supported on coil springs 194 disposed between the brackets 188 and 190 and encircling the bolts 192. An inclined screen 196 is mounted in the upper hopper part 186 for sifting all material prior to charging it into the tank 170. A platform 198 secured to the upper end of the lower fixed hopper element 180 carries a vibrator mechanism 200 adapted to oscillate the upper hopper part 186 to sift the materials placed therein downwardly through the screen 196. The vibrator mechanism 200 has a forwardly projecting shaft 202 carrying a sprocket wheel 204 through which the vibrator mechanism is driven as hereinafter described.

At the opposite side of the tank 170 from the filler neck 176 a water tank 206 is supported on spaced upwardly extending brackets 208. The water tank 206 houses a float valve mechanism generally indicated at 210 adapted to permit an accurately measured amount of water to be supplied from the water tank 206, through a line 212 including a valve 214 to a riser 216 mounted centrally of the tank 170 at the upper side thereof and communicating with the interior of the tank.

The float valve mechanism may be of a known construction, and includes an arm 217 which may be adjusted to vary the amount of water to be supplied by the mechanism. In the construction illustrated, the valve 214 is a three-way valve permitting water also to be supplied to the tank 206 through the line 212, from a line 218 having a hose coupling 220 at one end adapted for connection to a suitable water hose, and connected at its other end to the valve 214.

Between the spaced brackets 208, the tank 170 is provided with a manhole cover or access plate 222 of a type conventional in cylindrical tanks, and having a cylindrical inner surface forming a continuation of and part of the cylindrical inner surface of the tank.

A second tank 224, similar to the tank 170, but without the filler neck 176, hopper mechanism 178, and water tank 206, is disposed between the tank 170 and the platform 160 and supported on the frame 140 in coaxial relation with the tank 170 by means of cooperating brackets 226 and 228. The tank 224 is similarly provided with a manhole cover 230 similar to the manhole cover 222 of tank 170. Also, the tank 224 is provided with a centrally disposed, upwardly extending riser 232, similar to the riser 216, which communicates with the interior of the tank 224 and to which is connected a water line 234 having a valve 236, and which connects into the water supply line 218 ahead of the valve 214. The valve 236 is normally closed but may be opened to supply water to the tank 224 for cleaning it.

A drive shaft 238 extends axially through the tanks 170 and 224 and is supported at the opposite ends of each of the tanks 170 and 224 in stuffing boxes 240, hereinafter described in greater detail. The shaft 238 is driven from the motor 156 through a countershaft 242 driven from the motor by a chain 244 and from which the shaft 238 is driven through a chain 246. The shafts 238 and 242 are provided with sprocket wheels over which the chains 244 and 246 are trained, and which are proportioned to afford the desired speed of rotation of the shaft 238. Within each of the tanks 170 and 224, the shaft 238 carries a pair of agitator elements 248 angularly spaced 180° from one another. Each of the agitator elements 248 has a continuous outer edge including a portion 250, adapted upon rotation of the shaft 238, to wipe, or move in very close proximity to, the spherical inner end surface of the tank to remove any material tending to adhere to or build up upon this spherical inner surface. The continuous edge of the agitator element 248 also includes a portion 252 adapted, upon rotation of the shaft 238, to wipe or move in close proximity to the cylindrical inner surface of the tank and remove material adhering to or tending to accumulate upon this surface. Intermediate the edge portions 250 and 252, the continuous edge of the agitator element 248 has a smoothly curved edge portion 256 interconnecting the edge portions 250 and 252 and adapted to wipe the annular smoothly curved inner surface 258, by which the cylindrical inner surface of the tank is connected to the spherical inner end surfaces. The edge 252 is formed upon an arm portion 254 of the agitator 248, which arm portion is shaped similarly to a blade of an ordinary lawnmower, so that when the shaft 238 is driven by the motor 156, the materials scraped from the inner surface of the tank are worked toward the center of the tank. The arms 254 of the agitator elements 248 are so proportioned that each has an axial extent of slightly more than half of the length of the tank, thereby insuring that the complete inner surface of the tank will be wiped during each revolution of the shaft 238. The agitators 248 have a substantial thickness measured inwardly of the tank from its continuous edge 250, 252 and 256 thereby affording an effective mixing and agitation of the materials in the tanks.

As best illustrated in Fig. 8, the desired smooth continuous inner surface is obtained in the tanks 170 and 224 by forming the tanks of a cylindrical center section and a pair of similar end sections including cylindrical portions having an internal diameter equal to the internal diameter of the cylindrical center section. These end sections are abutted against the opposite ends of the center section and externally welded or otherwise suitably secured thereto so that the end sections cooperate with the center section to define a continuous smooth cylindrical inner surface.

Referring in particular to Fig. 12, the above-mentioned stuffing box 240, there illustrated in detail, comprises a generally tubular body 260 mounted in an aperture 262 opening axially through the end wall of the tank 224. At its inner end the body 260 has an annular outwardly extending flange 264 which, in cooperation with an annular external weld connecting the tank 220 and the body 260, holds the body 260 in place in the tank wall and the body and provides an annular seal between the body 260 and the tank wall. Also at its inner end the body 260 has a radially inwardly extending flange 268 defining a circular opening of a diameter slightly larger than the diameter of the shaft 238. The flange 268 tapers to a very thin radially inner edge. The body 260 has a cylindrical inner wall 270 extending outwardly from the flange 268 to its outer end and cooperating with the shaft 238 to define an annular chamber, in the inner portion of which, adjacent the flange 268, is a suitable packing material 272. This packing is compressed between the flange 268 and a tubular packing follower 274 having a cylindrical exterior adapted to project into and closely fit the inner wall 270 of the body 260. The adjacent faces 276 and 278 of the flange 268 and the packing follower 274 respectively, are oppositely inclined to compress the packing 272 toward the shaft 238. The axially inner and radially outer corner of the packing follower 274 is relieved as indicated at 280 to facilitate insertion of the packing follower into the body 260. Adjacent its inner end the follower 274 has a slight clearance with the shaft 238, and adjacent its outer end it carries a bearing 282 in which the shaft 238 is journaled. The body 260, adjacent its outer end, is externally threaded as indicated at 284 to receive an internally threaded cap 286 which fits a reduced outer end portion 288 of the packing follower 274 and engages an outwardly presenting shoulder 290 to move the follower 274 inwardly. In use, the cap 286 is tightened until a small annular portion 292 of the packing 274 is extruded past the radially inner edge of the thin flange 268, through the narrow annular opening defined by the flange 268 and the shaft 238. This inwardly extruded portion 292 of the packing prevents the pressure within the tank from forcing the cement grout past the flange 268 and to the bearing 282, and wipes the shaft 238. Portions of this inwardly extending section of the packing gradually fall off into the mix and the cap 286 is periodically tightened to insure that at all times there is an annular portion of the packing extending past the flange 268.

The tanks 170 and 224 are connected at their adjacent low points by a line 294 (see Fig. 8) in which is provided a transfer valve 296, generally similar to the valve 84 of the above-described embodiment, illustrated in Figs. 1 through 7 inclusive. The valve 296, illustrated in detail in Fig. 13, comprises a flexible tube or sleeve 298 provided with adapters 300 at its opposite ends, which have externally ribbed tubular portions 302 and internally threaded outer end portions for connection to the line 294. The ends of the tube 298 are received over and clamped to the ribbed tubular portions 302 by upper and lower semi-cylindrical sleeve supporting elements 302 and 304, respectively, which are provided with cooperating flanges 306 and 308 which receive screws 310 for clamping the elements 302 and 304 together. The upper sleeve supporting element 302 carries a cylinder 312 in which is mounted a piston 314 carrying a plunger 316 adapted to project through an opening 317 in element 302 to fold an upper portion of the tube 298 downwardly against the lower portion thereof and effectively close it off. The piston 314 may be moved downwardly to close the tube 298 by supplying air pressure to the upper side of the piston 314 through a line 318 provided with a valve 320 (see Fig. 8). As hereinafter described in greater detail, the valve 320 is a three-way valve movable to one position for venting the upper portion of the cylinder 312 and shutting off the supply of air to the upper side of the piston 314. The piston 314 is urged to the upper limit of its travel by a coil spring 322 encircling the plunger 316 and acting against the lower wall of the cylinder 312 and the piston 314.

The tank 224 is also provided with a discharge or outlet connection 324 at the forward part of the tank adjacent the low point thereof. A suitable line or hose 326 is connected to the discharge connection 324 and leads to a spray gun 328, at its other end.

The spray gun 328 is generally similar to the spray gun 126 of the above described embodiment illustrated in Figs. 1–7 inclusive and similarly includes a rubber sleeve valve of the type illustrated in Figs. 7 and 13, which is normally held in the collapsed or closed position by air pressure delivered through an airline 330 leading to a valve 332 which selectively applies the air pressure from the line 330 either to a cylinder 334 through a line 336, for collapsing the sleeve valve, or to the nozzle 338 through a line 340. A cock type valve 342 is provided in the line 340 for affording a desired control of the volume of air to be supplied to the nozzle 338 through the line 340.

Referring to Fig. 9, the spray gun nozzle 338 comprises a body 344 externally threaded at its outer end and internally threaded at its inner end and mounted on the outer end of the spray gun 328 by an annular element 346 externally threaded for engagement with the threaded inner end of the nozzle body 344. The annular element 346 encircles the outer end portion of a metal reinforcing tube 348 housing the flexible valve sleeve element 350, through which the cement grout is supplied and cooperates with the reinforcing tube 348 to define an annular air chamber 352. The air line 340 is connected at its outer end to the element 346 and communicates with the chamber 352. A circle nozzle plate 354 carried in the nozzle body 344 fits over the outer end of the rubber sleeve 350, which in the construction illustrated terminates in an outwardly turned flange portion 356 having a plurality of axially extending apertures 358 communicating with the annular air chamber 352. The nozzle plate 354 has an inwardly projecting central portion 360 which fits within the rubber sleeve 350 and defines a conical central opening 362 therethrough. The outer marginal portion of the nozzle plate 354 is provided with a plurality of equally angularly spaced radially inwardly inclined openings 364 registering at one end with the openings 358, and each adapted to direct a jet of air from the air chamber 352 at a predetermined point on the axis on the nozzle body 344 axially outwardly of the plate 354.

The nozzle body 344 also carries a flexible annular rubber element 366 and an annular orifice controlling member 368 internally threaded for engagement with the externally threaded outer end portion of the nozzle body 344. The member 368 may be moved axially of the nozzle body 344 by means of its threaded engagement with the nozzle body, and upon such axial movement relative to the nozzle body is effective, as hereinafter described, to vary the size of the orifice defined by the flexible element 366. At its inner end, the flexible element 366 has an outwardly extending annular flange 370 gripped between a cooperating shoulder on the nozzle body 344 and an outer marginal portion of the inner face of the nozzle plate 354, outwardly of the openings 364. Spaced inwardly from its outer end the body 344 has an annular inwardly extending projection defining an outwardly presenting annular shoulder 372.

The flexible orifice element 366, in its free or undistorted condition, has an inner cylindrical surface 374 defining the desired maximum orifice opening and extending from a point axially inwardly of the shoulder 372 to the outer end of the element 366. The radially outer surface of the element 366 is shaped to provide an annular radially outwardly extending projection 376 adapted to engage the shoulder 372, a sealing flange portion 378 at the outer end of the element 366, and an intermediate radially outwardly extending annular portion 380 which, upon compression axially, cooperates in varying the size of the orifice defined by the element 366. In the normal or free condition of the element 366, the sealing flange 378 extends radially and axially outwardly. Upon assembly of the nozzle 338, the flange 378 is engaged by an annular element 382 carried by the member 368 and deformed to the position illustrated in Fig. 9 in which it provides a seal preventing the cementitious material from getting into the space between the element 366, the member 368 and nozzle body 344. The element 382 has an inclined inner surface 384 cooperating with the shoulder 372 upon movement of the member 368 axially inwardly to deform the inner surface of the element 366 to some position such as that illustrated in broken lines in Figure 9, thereby reducing the orifice size. The element 382 is adapted to move into the outer end of the nozzle body 344 upon movement of the member 368 axially inwardly from the position of maximum orifice opening illustrated in Fig. 9. Also, the annular element 382 has an axially inwardly extending flange 386 at its radially outer edge which presses the outer portion of the projection 380 into the outer end of the nozzle body 344 and cooperates in deforming the element 366 radially inwardly.

It will be appreciated that any suitable airline system may be provided for supplying the desired air pressures from the compressed air reservoir provided by the frame members 142, 144 and 146, to the tanks 170 and 224 and the lines 318 and 330 leading respectively to the transfer valve 296, and the spray gun 328. In the embodiment illustrated in Figures 8–13, the line 330 leading to the spray gun 328 is connected directly to the compressed air reservoir member 142 just rearwardly of the engine 156 through an air pressure gauge 388, a pressure-reducing valve 390 and a line 392. As an instance of a satisfactory pressure in the line 330 for operating the spray gun 328, it has been found that a pressure of 60 pounds per square inch in the line 330 gives good results.

Air under pressure is supplied from the reservoir provided by the frame 140 to the line 318 leading to the valve 296 and to the tanks 170 and 224 through their risers 216 and 232 respectively, through the following briefly-described air line system. An air pressure supply line 394 runs from a reservoir member 142 to a pressure reducing valve 396. Air pressure is supplied to the tank 170 through a line 398 connected to the riser 216 at one end and including an air pressure gage 400 and a valve 402, and connected at its other end into the line 394 at the high pressure side of the reducing valve 396. Air pressure is supplied to the tank 224 through a line 404 connected at one end to the riser 232 and including an air pressure gage 406 and a valve 408, and having its other end connected to the low pressure side of the reducing valve 396. Air pressure is supplied to the valve 296 through the line 318 which includes the valve 320 and is connected into the air pressure supply line 394 at the high pressure side of the pressure reducing valve 396. As mentioned above, with reference to the valve 320, the valves 402 and 408 are three-way valves connected to a vent line 410 so that the tanks 170 and 224, as well as the upper portion of the piston cylinder 312 of the valve 296 may be vented to atmosphere when desired.

The sprocket wheel 204 of the above-described vibrator mechanism 200 is driven through a chain 412 trained over the sprocket wheel 204 and also trained over a sprocket wheel fixed on the shaft 238 intermediate the tanks 170 and 224.

The operation of the embodiment illustrated in Figs. 8 through 13, inclusive, is generally similar to that of the embodiment illustrated in Figs. 1 through 7, inclusive, and briefly stated is as follows. The desired proportions of the dry materials are placed in the hopper mechanism 178 from which they are dropped into the tank 170 by operation of the lever 184. During this loading of the tank 170 the air valve 402 is turned to vent the interior of the tank 170 to atmospheric pressure through the vent line 410. Also prior to charging the tank 170, the valve 320 should be turned to the position in which air pressure is applied to the valve 296 collapsing the sleeve 298 and closing the line 294. At the time of charging the dry materials into the tank 170, the valve 214 is opened, permitting an accurately measured amount of water to drain from the tank 206 into the tank 170. After the flow of water ceases, the valve 214 is returned to its closed position. After closing the hopper cover 182 by means of the lever 184, the airline valve 402 is then turned to a position in which air pressure is supplied from the high pressure side of the pressure reducing valve 396 through the line 398 to the tank 170. The pressure within the tank 170 rapidly builds up to that at the high pressure side of the pressure reducing valve 396 and the materials within the tank 170 are mixed and agitated by the agitator elements 248 while being continuously subjected to this pressure for a desired length of time. As an instance of a satisfactory mixing period which has been found to afford the advantageous results indicated herein, it has been found that a period of two minutes may be used. At the end of this to atmosphere through the line 410, or in a position in which the upper side of the piston 314 of the valve 296 is vented to atmosphere through the line 410 which permits the spring 322 to raise the plunger 316, opening the sleeve 298, and permitting the air pressure within the tank 170 to force the material therein through the line 294 and the valve 296 into the tank 224. During the initial transfer operation, the air line valve 408 may either be in a position venting the tank 224 to atmospheric through the line 410, or in a position connecting it to the low pressure side of the reducing valve 396. When the transfer is completed, the valve 320 is returned to the position in which pressure is applied to the valve 296 closing the line 294. At this time, if not before, the valve 408 is turned to apply air pressure from the low pressure side of the reducing valve 396 to the tank 224. The material in the tank 224 may then be applied as desired by the spray gun 328 by moving the valve 332 to a position in which air pressure of the line 330, rather than being applied to the cylinder 334, is supplied through the line 340 to the nozzle 338. During the spraying of the material from the tank 224, and after the closing of the valve 296, the air line valve 402 may be turned to vent the tank 170 to atmosphere and after the pressure therein is relieved another batch of material may be charged into the tank 170 from the hopper mechanism 178 and the proper amount of water supplied thereto by opening the valve 214. After the hopper door 182 is again returned to the closed position by the lever 184 and the water line valve 214 is again closed, the air line 402 may be again turned to the position in which the tank 170 is directly connected to the high pressure side of the pressure reducing valve 396 and another batch may be mixed in the tank 170 while the former batch is being sprayed from the tank 224. When the mixing in the tank 170 is completed, and while the spraying from the tank 224 is continuing, the valve 320 may be turned to open the transfer valve 296 and the pressure differential in the tanks 170 and 224, corresponding to the pressure differential between the high and low pressure sides of the pressure reducing valve 396, will be effective to quickly transfer the second batch of mixed material from the tank 170 to the tank 224. It will thus be appreciated that the apparatus of this embodiment also permits continuous operation.

While only two specific embodiments of the invention have been illustrated and described in detail, it will be readily appreciated by those skilled in the art that various modifications and changes may be made without departing from the spirit of the present invention.

What is claimed is:

1. An apparatus for preparing cementitious materials which, upon setting, will be substantially free of shrinkage cracks and have greatly improved strength, said apparatus being adapted for mixing a ground argillo-calcareous material, water, and an aggregate to rapidly effect a relatively high and uniform hydration of said material and for supplying a continuous flow of substantially uniformly mixed cementitious material including ground argillo-calcareous material so hydrated and an aggregate, said apparatus comprising a mixing tank, means for agitating and mixing the contents of said tank, means for applying a pressure substantially above atmosphere to the contents of said tank during the mixing operation, a second tank adapted to receive the liquid mix, conduit means connecting said tanks so that the liquid mix may be transferred from said mixing tank to said second tank, valve means for opening and closing said conduit means, and means for applying to the contents of said second tank a pressure substantially lower than said pressure but substantially above atmospheric pressure so that a desired pressure differential may be established which may be employed to transfer the liquid mix from the mixing tank to the second tank without reducing the pressure in said second tank.

2. An apparatus for preparing and putting in place cementitious materials which, upon setting, will be substantially free of shrinkage cracks and have greatly improved strength, said apparatus being adapted for mixing a ground argillo-calcareous material, water, and an aggregate to rapidly effect a relatively high and uniform hydration of said material, for supplying a continuous flow of substantially uniformly mixed cementitious material including ground argillo-calcareous material so hydrated and an aggregate, and for putting the mixed cementitious material in place, said apparatus comprising a mixing tank, means for agitating and mixing the contents of said tank, means for applying a pressure substantially above atmosphere to the contents of said tank during the mixing operation, a second tank adapted to receive the liquid mix, conduit means connecting said tanks so that the liquid mix may be transferred from said mixing tank to said second tank, valve means for opening and closing said conduit means, means for agitating the liquid mix in said second tank, means including other conduit means connected to said second tank for putting the mixed cementitious material in place, and means for applying to the contents of said second tank a pressure substantially lower than said pressure but substantially above atmospheric pressure so that a desired pressure differential may be established which may be employed to transfer the liquid mix from the mixing tank to the second tank without reducing the pressure in said second tank.

3. An apparatus for preparing and spraying cementitious materials which, upon setting, will be substantially free of shrinkage cracks and have greatly improved strength, said apparatus being adapted for mixing a ground argillo-calcareous material, water, and an aggregate to rapidly effect a relatively high and uniform hydration of said material, for supplying a continuous flow of substantially uniformly mixed cementitious material including ground argillo-calcareous material so hydrated and an aggregate, and for spraying the mixed cementitious materials, said apparatus comprising a mixing tank, means for agitating and mixing the contents of said tank, means for applying a pressure substantially above atmosphere to the contents of said tank during the mixing operation, a second tank adapted to receive the liquid mix, conduit means connecting said tank to said second tank, valve means for opening and closing said conduit means, means including other conduit means connected to said second tank and a spray gun connected to said other conduit means for spraying the mixed cementitious materials, and means for applying to the contents of said second tank a pressure substantially lower than said pressure but substantially above atmospheric pressure so that a desired pressure differential may be established which may be employed to transfer the liquid mix from the mixing tank to the second tank without reducing the pressure in said second tank.

4. An apparatus for preparing and putting in place cementitious materials which, upon setting, will be substantially free of shrinkage cracks and have greatly improved strength, said apparatus being adapted for mixing a ground argillo-calcareous material, water, and an aggregate to rapidly effect a relatively high and uniform hydration of said material, for supplying a continuous flow of substantially uniformly mixed cementitious material including ground argillo-calcareous material so hydrated, and an aggregate, and for putting the mixed cementitious materials in place, said apparatus comprising a mixing tank, rotary means for agitating and mixing the contents of said tank, means for applying a pressure substantially above atmosphere to the contents of said tank during the mixing operation, a second tank adapted to receive the liquid mix, conduit means connecting said tank so that the liquid means may be transferred from said tank to said second tank, valve means for opening and closing said conduit means, rotary means for agitating the liquid mix in said second tank, means including other conduit means connected to said second tank for putting the mixed cementitious material in place, means for applying to the contents of said second tank a pressure substantially lower than said pressure but substantially above atmospheric pressure so that a desired pressure differential may be established which may be employed to transfer the liquid mix from the mixing tank to the second tank without reducing the pressure in said second tank, and common motor driven means for driving both agitating and mixing means.

5. An apparatus for preparing and putting in place cementitious materials which, upon setting, will be substantially free of shrinkage cracks and have greatly improved strength, said apparatus being adapted for mixing a ground argillo-calcareous material, water, and an aggregate to rapidly effect a relatively high and uniform hydration of said material, supplying a continuous flow of substantially uniformly mixed cementitious material including ground argillo-calcareous material, so hydrated, and an aggregate, and putting the mixed cementitious materials in place, said apparatus comprising a mixing tank adapted to withstand an internal pressure of at least 100 lbs. per square inch, means for agitating and mixing the contents of said tank, means for applying a pressure of at least 100 lbs. per square inch to the contents of the tank during the mixing operation, a second tank adapted to receive the liquid mix and to withstand an internal pressure of at least 60 lbs. per square inch, conduit means connecting said tanks so that the liquid mix may be transferred from said mixing tank to said second tank, valve means for opening and closing said conduit means, means for agitating and mixing the liquid mix in the second tank, means including other conduit means connected to said second tank for putting the mixed cementitious materials in place, and means for applying to the contents of said second tank a pressure of at least 60 lbs. per square inch, but substantially lower than the pressure applied to said mixing tank so that a desired pressure differential may be established which may be employed to transfer the liquid mix from the mixing tank to said second tank without reducing the pressure in said second tank.

WARREN G. BROWN.
WARREN DURAND BROWN.

REFERENCES CITED

The following references are of record in the file of this patent:

UNITED STATES PATENTS

| Number | Name | Date |
|---|---|---|
| 851,603 | Long | Apr. 23, 1907 |
| 991,814 | Akeley | May 9, 1911 |
| 1,024,221 | Osgood | Apr. 23, 1912 |
| 1,223,586 | Johnson | Apr. 24, 1917 |
| 1,323,663 | Weber | Dec. 2, 1919 |
| 1,785,024 | Evans | Dec. 16, 1930 |
| 1,810,271 | Fraenkel | June 16, 1931 |
| 1,997,897 | Couley | Apr. 16, 1935 |
| 2,067,105 | Stevens et al. | Jan. 5, 1937 |
| 2,073,779 | Bramsen | Mar. 16, 1937 |
| 2,137,328 | Bissell | Nov. 22, 1938 |
| 2,149,930 | Plastaras | Mar. 7, 1939 |
| 2,165,916 | Bissell | July 11, 1939 |
| 2,238,051 | Hackley | Apr. 15, 1941 |
| 2,259,215 | Schuerer | Oct. 14, 1941 |
| 2,305,840 | Brown et al. | Dec. 22, 1942 |
| 2,366,969 | Kiggins | Jan. 9, 1945 |